June 10, 1930.   C. E. SNYDER   1,763,106
METHOD OF MAKING RUBBER TUBES
Filed July 27, 1928   2 Sheets-Sheet 2
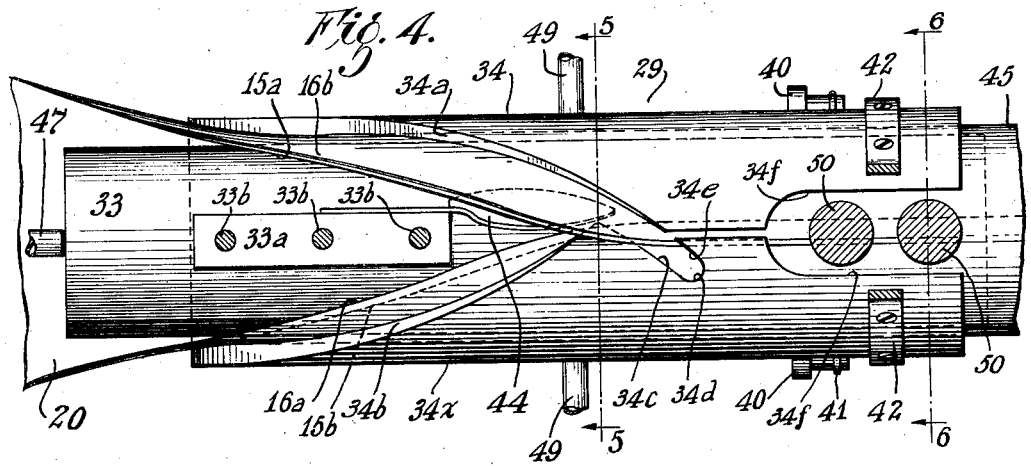
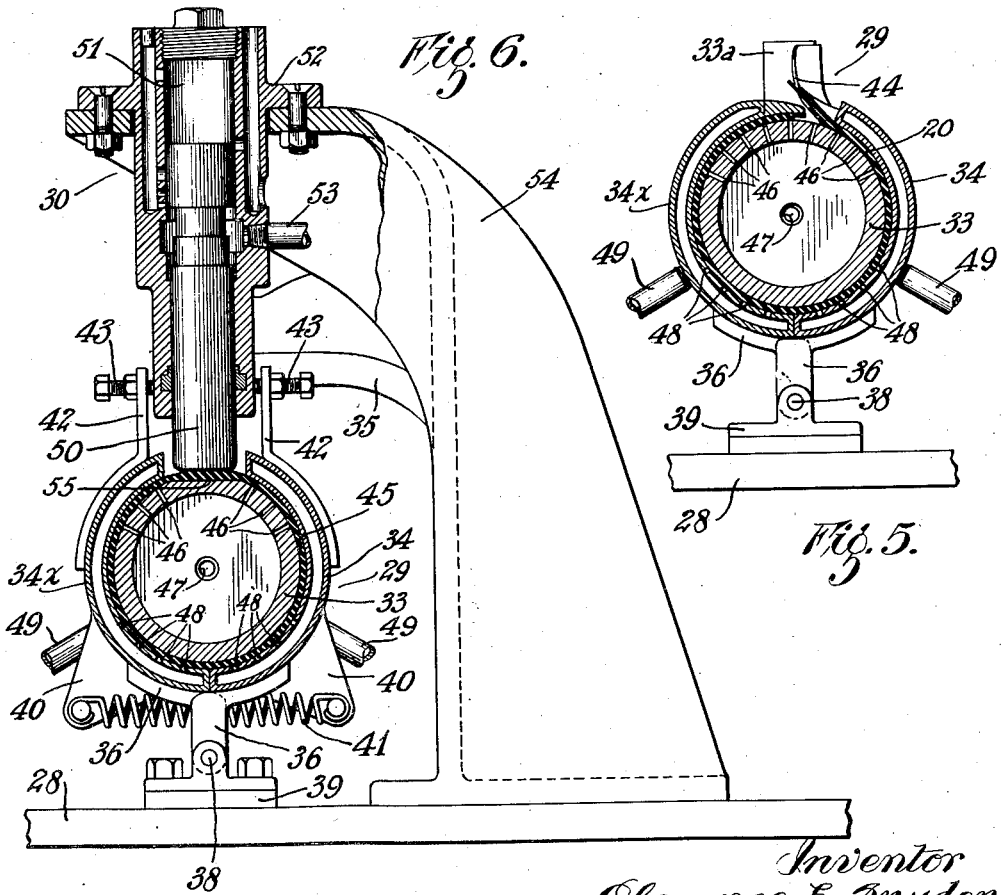
Inventor
Clarence E. Snyder
By Eakin & Avery
Attys Patented June 10, 1930

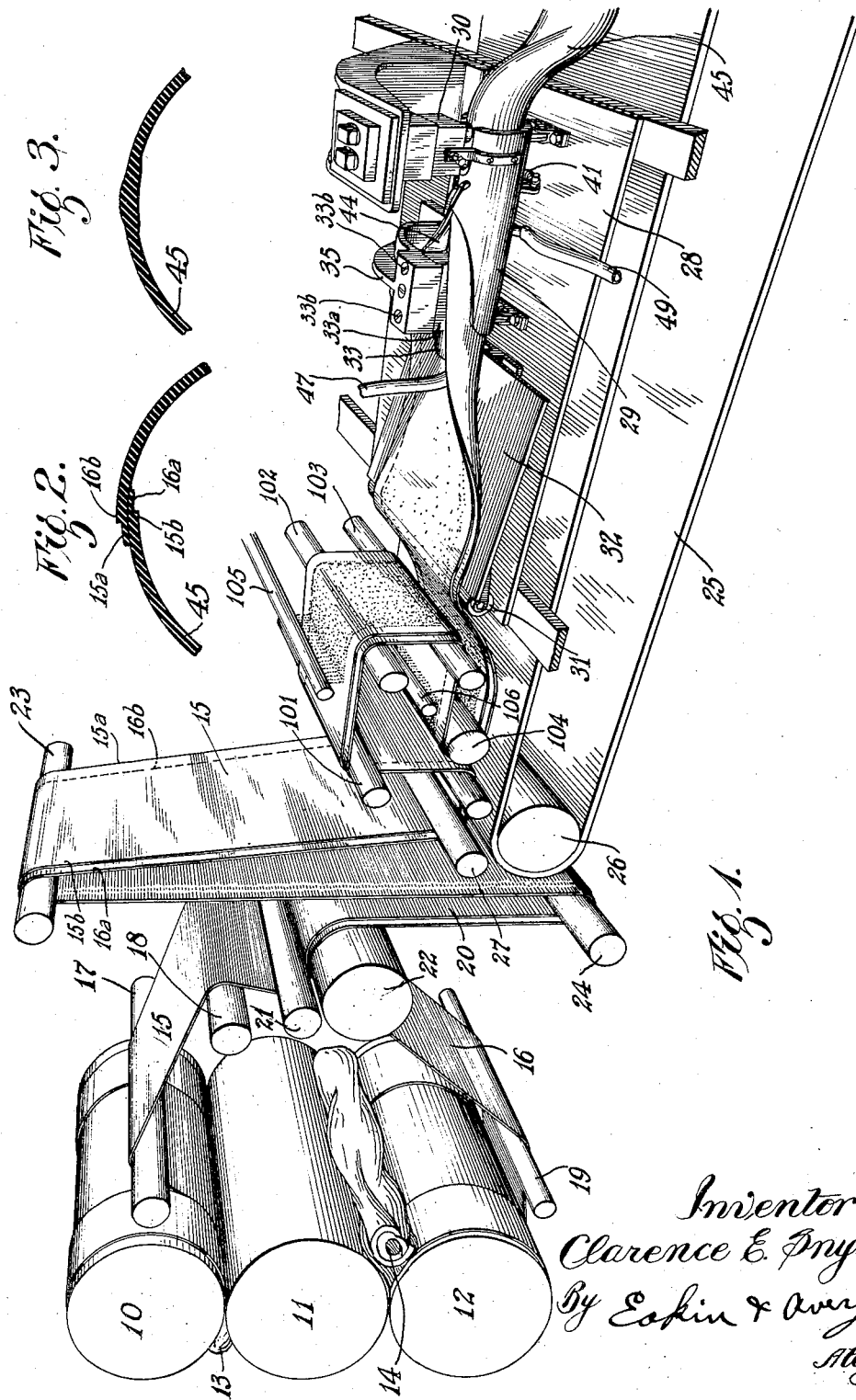

1,763,106

UNITED STATES PATENT OFFICE

CLARENCE E. SNYDER, OF AKRON, OHIO, ASSIGNOR TO THE B. F. GOODRICH COMPANY, OF NEW YORK, N. Y., A CORPORATION OF NEW YORK

METHOD OF MAKING RUBBER TUBES

Application filed July 27, 1928. Serial No. 295,692.

This invention relates to methods of making rubber tubes, and especially to the manufacture of unvulcanized rubber tubing which subsequently may be severed into lengths and formed into endless inner tubes for pneumatic tires.

My chief object is to provide improved procedure for rapidly and economically producing laminated, longitudinally-seamed tubing in continuous strip form. Other more detailed objects will be manifest in the following specification.

Of the accompanying drawings:

Fig. 1 is a perspective view of apparatus adapted for the practice of my invention in its preferred form, parts being broken away and in section.

Fig. 2 is a fragmentary section of the work through the longitudinal seam thereof as the latter is initially formed.

Fig. 3 is a view similar to Fig. 2 at a subsequent period of operation showing the seam in its final coalesced or healed condition.

Fig. 4 is a plan view of sheet-folding apparatus adapted for the performance of one step of my method.

Fig. 5 is a section on line 5—5 of Fig. 4.

Fig. 6 is a section on line 6—6 of Fig. 4.

In the manufacture of seamed rubber tubes it is advantageous, in order to provide a strong and impervious seam, to use warm, freshly-calendered stock, and I have conceived, and found to be feasible, the thought of progressively forming a continuous strip of such stock and progressively folding and seaming it to produce a longitudinally-seamed, continuous tube. I find that the stock may be successfully so manipulated immediately after the strip is delivered from the calender, without any intervening handling of the stock, and that a plurality of the freshly sheeted strips may be successfully plied-up and progressively folded and seamed to produce a laminated tube.

The stock preferably is sheeted on the usual three-roll calender having rolls 10, 11, and 12 drawing and sheeting the stock from two banks of stock, 13, 14, to provide two sheeted strips 15, 16, in convenient relation for plying them up, as by drawing them over suitable guide-rolls 17, 18 and 19 and passing them into face-to-face contact with each other, to produce a continuous, two-ply, laminated strip 20, the laminated strip being pressed between presser-rolls 21, 22. The strips 15, 16 are cut to correct width, preferably on the calender rolls, before they are plied up, and the two strips preferably are plied up with one margin of each, 15ª or 16ª, extending laterally beyond the adjacent margin, 16ᵇ or 15ᵇ, of the other, with the result that the laminated or composite strip 20 has marginal portions of diminishing thickness, as is clearly shown in Figs. 1 and 2.

The laminated strip 20 preferably is passed through a reserve loop or series of loops at a position between the strip-producing means and strip-folding and seaming means, as shown, to provide for a variable supply of the strip material and thus permit variation in the relative speeds of the strip at the forming and at the folding positions. In Fig. 1 of the drawings means for maintaining the reserve loops is diagrammatically shown as comprising a roller 23 journaled at a fixed position and a vertically movable floating roller 24 supported in a loop or festoon of the strip 20.

From the storage loops the strip 20 is passed, as by means of a conveyor belt 25 mounted at one end upon a pulley 26 and provided at its receiving end with a strip-guiding roll 27, to a dusting station where it passes around suitably positioned rollers 101, 102, 103, 104 to describe a reverse loop wherein its respective faces are alternately uppermost, and a lubricant or adhesion-preventing powder such as powdered soapstone is distributed, through mechanism such as the perforated pipes 105, 106, upon the respective faces of the strip as they are presented uppermost, along a central zone spaced from the margins of the strip.

From the dusting station the conveyor 25 carries the strip 20 to a strip-folding and seam-coalescing station, and the apparatus for performing these operations preferably is mounted upon a table 28 as shown, which spans the upper reach of the conveyor. After being folded into a tube the strip passes again onto the conveyor 25 and the friction of the tube with the conveyor furnishes sufficient pull to draw the strip 20 through the strip-folding apparatus such as the device 29 and seam-coalescing apparatus such as the seam-hammering device 30.

In performing the method by means of the particular apparatus here shown the strip 20, passing upward off the conveyor 25, is drawn over a guide roller 31 journaled at the work-receiving end of an inclined strip-guide 32 and then passes in a descending path on the latter toward the receiving end of the folding device 29. The latter is adapted to fold the lateral margins of the strip 20 upward and over onto each other in overlapped relation, and the downward inclination of the strip as it approaches the folding device provides for folding the flat strip to tubular form without excessive stretching of the marginal portions of the strip, the strip assuming tubular form by progressive descent of its middle zone with the latter supported by the guide 32 and the margins taking approximately the shortest course from the roll 31 to their positions within the folder, distorting, hammock-like support of the fresh, soft stock being largely avoided by the continuing local support of the guide 32.

The strip-folding device 29 which I prefer to use is best shown in Figs. 4, 5, and 6 and comprises a hollow cylindrical axial form or mandrel 33 and a pair of concentric, transversely-arcuate, hollow sleeve-members 34, 34$^\times$ extending about said axial form at the respective sides thereof and being radially spaced therefrom so as to define therewith a stock-receiving space. The mandrel is supported in horizontal position from above, being formed with a boss 33$^a$ which is secured by screws 33$^b$, 33$^b$ to an overhanging bracket-arm 35 mounted upon the table 28.

Each sleeve-member 34, 34$^\times$ is provided at its lower margin adjacent its ends with respective hinge members 36, 36 and the hinge members of both sleeves are pivoted in axial alignment at 38, 38 upon respective brackets 39, 39 mounted upon the table 28. Each sleeve member is provided with a downwardly extending arm 40 and said arms are connected by a tension spring 41 lying beneath the sleeves and normally above the axis of the pivots 38, the arrangement being such that the sleeves are yieldingly held normally in closed or operative position, but may be held in opened position, with the spring 41 in over-center position with relation to the axis 38, upon occasion, as when the leading end of the strip 20 is initially threaded through the folder. Arms 42, 42 extending upward from the respective sleeve-members 34, 34$^\times$ have their respective end portions provided with set-screws 43, 43 which bear against the opposite sides of the seam-coalescing device 30 when the sleeve members are in operative position, to position said sleeve-members.

The folding of the strip 20 to tubular form and the overlapping of its marginal portions by the sleeve-members 34, 34$^\times$ is effected with desirable accuracy by reason of the shape of the upper margins of the said members, as will best be understood by reference to Figs. 1 and 4. The upper margins 34$^a$, 34$^b$ of the sleeve-members 34, 34$^\times$ recede from the work-receiving end of the device in helicoidal curves, and the margin 34$^b$ is of lesser pitch than the margin 34$^a$ where they approach each other at the upper, middle zone of the device, and from an approximately medial position in said zone the margin 34$^b$, Fig. 4, continues in a reach 34$^c$ transverse to its helicoidal reach and uniformly spaced from the margin 34$^a$ and then in a semicircular reach 34$^d$ and a return reach 34$^e$, the latter lying in extension of the margin 34$^a$, so that the reaches 34$^c$, 34$^d$ and 34$^e$ of the margin 34$^b$ and the adjacent part of the margin 34$^a$ define in effect a closed-end slot which accommodates and whose walls suitably guide the margins 15$^a$—16$^b$ of the laminated strip 20.

A plow 44 is mounted upon the boss 33$^a$ of the mandrel 33, and extends toward the point where the converging margins 34$^a$, 34$^b$ of the sleeves 34, 34$^\times$ approach nearest each other, the plow 44 being adapted to hold the overlying margin 15$^a$—16$^b$ of the strip 20 out of contact with the underlying margin 16$^a$—15$^b$ thereof until both are properly positioned at a point adjacent the coalescing device 30 as is most clearly shown in Figs. 4 and 5. The overlapped marginal portions of the laminated strip 20 are shown in Fig. 2 and the tubular structure thus formed is designated 45.

The strip 20 is folded accurately to size by reason of the close engagement of the mandrel 33 and the folding sleeves 34, 34$^\times$ with both broad faces of the strip. To avoid excessive friction between the strip and folder, provision preferably is made for causing low-pressure jets of air to impinge against the inner and outer surfaces of the strip so as to provide air-lubrication.

To this end the mandrel 33 is formed with a plurality of apertures 46, 46 extending through its upper wall adjacent the delivery end thereof and the hollow interior of the mandrel is connected with a source of pressure fluid through a supply-pipe 47 mounted in the end wall of the mandrel at the work-receiving end thereof. Also, for air-lubrication, the sleeve-members 34, 34$^\times$ have their inner walls formed with apertures 48, 48 in their lowermost portions and the hollow interiors of said members are connected with a source of pressure fluid through respective supply-pipes 49, 49.

Before the tube 45 completely passes from the mandrel 33 and folding sleeves 34, 34$^\times$ its seam, comprising the overlapped marginal portions of the strip 20, is compacted and coalesced by the seam-hammering device 30 for which the mandrel 33 of the folding device, which is formed on its upper side with a flattened zone 55, serves as an anvil.

The seam-hammering device comprises a pair of hammers 50, 50 which are positioned in longitudinal alignment over the upper middle zone of the mandrel, over which the tube-seam is drawn, and the sleeve-members 34, 34ˣ are cut away at 34ʳ, 34ʳ at their delivery end to expose the seam to the hammers. The hammers preferably are of the pneumatic type, as shown, being mounted in respective double-acting fluid-pressure cylinders such as the cylinder 51, Fig. 6, of a cylinder-block 52, and actuated by fluid-pressure from a pressure line such as that shown at 53, Fig. 6. The arrangement of inlet and exhaust ports of the cylinder 51 is well known and will be understood from the drawing without further description. The cylinder-block 52 is supported from an overhanging bracket 54 mounted upon the table 28.

The hammers 50 are preferably adapted for such rapid reciprocation as to provide for an overlapping of the areas of the seam which are compacted by successive blows and as to permit substantially uninterrupted movement of the tube through the folding and hammering devices at a speed equal to the speed at which the strip 20 is delivered from the calender.

The tube 45 passes from the folding and seam-coalescing devices back onto the conveyor 25, being pulled by the conveyor through the said devices, and thereafter the tube, either upon the conveyor or after it is delivered therefrom, is cut into lengths each suitable for the formation of an inner tube for a pneumatic tire when such tubes are the product desired. The ends of each tube length are then spliced together, preferably while the stock is still in an unvulcanized condition, and the tube is vulcanized in a mold under internal fluid pressure which results in an almost perfectly coalesced and impervious seam, which is of approximately the same thickness as the rest of the tube wall when the tube is formed of a strip having margins of decreasing thickness toward their edges, as in the case of the laminated strip having its laminations offset from each other as here shown.

The invention provides a rapid and continuous method of making longitudinally-seamed laminated rubber tubing having a well coalesced and impervious seam and provides for economical production of inner tubes of high quality.

The adhesion-preventing dust on the interior surface of the tube prevents the inner face of the tube from adhering to itself when the tube naturally collapses after passing onto the conveyor 25.

The tube, being made from warm, freshly-calendered stock, no treatment such as applying solvent to the margins of a strip is necessary to obtain a strong bond between the margins when they are lapped together to form a seam, and the expense of storage and the expense of employing equipment such as liners for storing and handling the stock are avoided.

The overlapping of the stepped margins of the strip with the stepped surface of one exposed within the tube and with the stepped surface of the other exposed on the exterior of the tube, as shown clearly in Fig. 2, makes unnecessary such extreme accuracy of the overlap as would be necessary for interfitting the stepped surfaces with each other, and yet, when the tube is vulcanized in a mold under internal fluid pressure a smooth and impervious seam of only moderate thickness is obtained.

My invention is susceptible of modification within the scope of the appended claims.

I claim:

1. The method of making a rubber tube which comprises progressively forming a flat, sheeted strip of unvulcanized rubber from a supply mass of stock, feeding it from the forming position as it is formed, and progressively folding its side margins into contact with each other and thereby forming a tube of the strip as it is so fed.

2. A method as defined in claim 1 in which the flat, sheeted strip is formed with a margin of diminishing thickness toward its edge.

3. A method as defined in claim 1 in which the flat, sheeted strip is formed with a margin of diminishing thickness toward its edge by plying up a plurality of sheeted strips with a margin of one strip extending laterally beyond the adjacent margin of another.

4. The method of making a rubber tube which comprises progressively forming a flat, sheeted strip of unvulcanized rubber from a supply mass of stock, feeding it from the forming position as it is formed, progressively folding its side margins into contact with each other and thereby forming a tube of the strip as it is so fed, severing the tube into lengths, splicing together the ends of each length to form an endless tube, and vulcanizing the endless tube in a mold under internal fluid pressure.

5. A method as defined in claim 4 in which the flat, sheeted strip is formed with a margin of diminishing thickness toward its edge.

6. A method as defined in claim 4 in which the flat, sheeted strip is formed with a margin of diminishing thickness toward its edge by plying up a plurality of sheeted strips with a margin of one strip extending laterally beyond the adjacent margin of another.

7. The method of making a rubber tube which comprises plying up a plurality of sheeted strips of rubber of substantially equal widths with one strip laterally offset with relation to another to provide a laminated strip having stepped margins, overlapping one of said margins upon the other with the stepped surface of one exposed within the resulting tube and with the stepped surface of the other exposed on the exterior of the tube and vulcanizing the tube in a mold under internal fluid pressure.

In witness whereof I have hereunto set my hand this 23rd day of July, 1928.

CLARENCE E. SNYDER.